United States Patent
Dupont et al.

(10) Patent No.: US 8,080,793 B2
(45) Date of Patent: Dec. 20, 2011

(54) DEVICE FOR DETECTING INFRARED RADIATION COMPRISING A RESISTIVE IMAGING BOLOMETER, A SYSTEM COMPRISING AN ARRAY OF SUCH BOLOMETERS AND A METHOD FOR READING AN IMAGING BOLOMETER INTEGRATED INTO SUCH A SYSTEM

(75) Inventors: Benoît Dupont, Brussels (BE); Michel Vilain, Saint-Georges des Commiers (FR)

(73) Assignee: ULIS, Veurey Voroize (FR)

( * ) Notice: Subject to any disclaimer, the term of this patent is extended or adjusted under 35 U.S.C. 154(b) by 514 days.

(21) Appl. No.: 12/326,293

(22) Filed: Dec. 2, 2008

(65) Prior Publication Data
US 2009/0152465 A1   Jun. 18, 2009

(30) Foreign Application Priority Data
Dec. 12, 2007   (FR) ...................... 07 59787

(51) Int. Cl.
*G01J 5/00*   (2006.01)
*G01J 5/20*   (2006.01)
(52) U.S. Cl. .................. 250/338.1; 505/161
(58) Field of Classification Search ............... 250/338.1; 505/161
See application file for complete search history.

(56) References Cited

U.S. PATENT DOCUMENTS

| | | | |
|---|---|---|---|
| 6,791,085 B2 | 9/2004 | Martin et al. | |
| 6,953,932 B2* | 10/2005 | Anderson et al. | 250/338.1 |
| 2001/0040216 A1* | 11/2001 | Knauth et al. | 250/352 |
| 2003/0230733 A1* | 12/2003 | Tanaka | 250/553 |
| 2005/0029453 A1* | 2/2005 | Allen et al. | 250/332 |
| 2006/0231760 A1 | 10/2006 | Lee et al. | |
| 2006/0255274 A1* | 11/2006 | Lin | 250/336.1 |

FOREIGN PATENT DOCUMENTS
EP   1 211 888 A1   6/2002

OTHER PUBLICATIONS

E. Mottin et al., "*Uncooled Amorphous Silicon Technology Enhancement for 25 μm Pixel Pitch Achievement*," Infrared Technology and Application XXVIII, SPIE vol. 4820, 2002.

* cited by examiner

*Primary Examiner* — David Porta
*Assistant Examiner* — Mindy Vu
(74) *Attorney, Agent, or Firm* — Burr & Brown

(57) ABSTRACT

A device for detecting infrared radiation including a resistive imaging bolometer intended to be electrically connected to a circuit for measuring a resistance of the imagine bolometer, whereby the device initially controls and adjusts the resistance of the imaging bolometer by injecting current into the imaging bolometer.

23 Claims, 4 Drawing Sheets

DEVICE FOR DETECTING INFRARED RADIATION COMPRISING A RESISTIVE IMAGING BOLOMETER, A SYSTEM COMPRISING AN ARRAY OF SUCH BOLOMETERS AND A METHOD FOR READING AN IMAGING BOLOMETER INTEGRATED INTO SUCH A SYSTEM

FIELD OF THE INVENTION

The present invention relates to the field of infrared imaging and pyrometry using bolometers.

More particularly, the present invention relates to a device for detecting infrared radiation comprising a resistive imaging bolometer. It also relates to a system comprising an array of such devices as well as a method for reading an imaging bolometer integrated into such a system.

BACKGROUND OF THE INVENTION

In the field of infrared detectors, the use of devices configured in the form of an array and capable of operating at ambient temperature, i.e. not requiring cooling to extremely low temperatures, are known—in contrast to detecting devices referred to as "quantum detectors" which can only operate at extremely low temperature, typically that of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector generally includes:
means of absorbing the infrared radiation and converting it into heat;
means of thermally isolating the detector so that its temperature can rise due to the effect of the infrared radiation;
thermometric means which, in the context of a bolometric detector, use a resistance element;
and means of reading electrical signals provided by the thermometric means.

Detectors designed for infrared imaging are conventionally produced as a one- or two-dimensional array of elementary detectors, or bolometers, said bolometers being suspended above a substrate, that is generally made of silicon, by means of support arms.

The substrate usually incorporates means of sequentially addressing the elementary detectors, means of electrically exciting the elementary detectors and means of pre-processing the electrical signals generated by these elementary detectors. This substrate and the integrated means are commonly referred to as the "readout circuit".

In order to obtain a scene using this detector, the scene is projected through suitable optics onto the array of elementary detectors and clocked electrical stimuli are applied via the readout circuit to each of the elementary detectors or to each row of such detectors in order to obtain an electrical signal that constitutes an image of the temperature reached by each of said elementary detectors. This signal is then processed to a greater or lesser extent by the readout circuit and then, if applicable, by an electronic device outside the package in order to generate a thermal image of the observed scene.

It is apparent, however, that the thermal resistance $R_{th}$ of the support arms, associated with the heat capacity $C_{th}$ of an elementary bolometer, defines, for the latter, a thermal time constant $\tau_{th}$ that equals the product $R_{th}C_{th}$ and is usually of the order of about 10 ms.

This thermal time constant is inherent in every bolometer and has a detrimental effect which limits the market penetration of uncooled bolometric detectors for applications that involve onboard vision systems or tracking moving objects for example.

The time constant $\tau_{th}$ of a bolometer is high and this limits its response time. Thus, if the scene is prone to rapid variations in contrast, such as, for instance, the intrusion of an object that has a higher (or less high) temperature than that of the background of the scene (this is referred to as a "hot" or "cold" object), the bolometer has trouble keeping pace with such variations. It follows that the bolometer exhibits a thermal memory effect from one read frame to the next. Movement of a hot (or cold) object in the scene will therefore result in a blurring or smearing in the image formed.

This effect is similarly detrimental when dealing with a fixed scene in which, locally, there are rapid temperature fluctuations. The bolometer has trouble responding to variations that are faster than its time constant and therefore finds it difficult to reproduce the scene faithfully.

Also, the dispersed resistance values of the various elementary conductors results in dispersed current flow through them during readout. This results in signal dispersion for a uniform scene (this dispersion is referred to as "offset") as well as dispersion in sensitivity (or gain) to a variation in temperature.

Resistance dispersion is chiefly due to the variations inherent in various fabrication technologies and to the spatial distribution of the temperature of the substrate and the radiation environment.

Usually, this dispersion is compensated by an image correction computing function, referred to as "2-point" correction, off the focal plane, after tentative acquisition of offset and gain dispersion parameters.

Attempts can be made to reduce the time constant $\tau_{th}$ of bolometers in order to overcome these drawbacks.

However, it is difficult to reduce the heat capacity $C_{th}$ of a bolometer insofar as its heat capacity depends on the quantity of material used in order to fabricate the bolometer. Reducing the mass of the bolometer has the direct consequence of increasing the electrical noise of the bolometer because electrical noise power is related to the volume of the bolometer, at least when thermometric materials having a non-negligible low-frequency noise level are used. Moreover, geometric stability of the sensitive structures can no longer be ensured if there is less than an adequate quantity of structural material and this quantity cannot simply be reduced at will.

What is more, reducing the thermal resistance $R_{th}$ is not a satisfactory solution. In fact, doing so involves reducing the thermal isolation of the bolometer vis-à-vis the substrate, i.e. its sensitivity, because thermal resistance $R_{th}$ is directly related to the thermal detection sensitivity of the bolometer and this is the crucial factor that defines the thermal resolution of the bolometric detector.

It is apparent that, given the present state of the art, it is impossible to obtain a bolometric detector which is unaffected by blurring phenomena and which offers high performance in terms of thermal resolution, i.e. a high signal-to-noise ratio.

Generally speaking, a state-of-the-art bolometric detector is designed for a particular application. Usually, the time constant $\tau_{th}$ of such a bolometer is maximized by increasing $R_{th}$ by constructional means until a level of blurring that is deemed to be acceptable in the context of the application in question is reached.

The object of the present invention is to eliminate the unfavorable trade-off between the time constant of bolometers and their thermal resolution.

The object of the invention is therefore to provide, with the aid of simple, robust means, bolometric detectors that are substantially unaffected by blurring phenomena while offering high performance in terms of thermal resolution.

SUMMARY OF THE INVENTION

To achieve this, the object of the invention is a device for detecting infrared radiation comprising a resistive imaging bolometer intended to be electrically connected to a circuit for measuring a resistance of the bolometer.

According to the invention, this device comprises means of controlling the resistance of the imaging bolometer by injecting current into the bolometer. Thus, with the aid of this means of control, it is possible to set the resistance of the bolometer to a predetermined reference value at least once for every read cycle of the bolometer. The effect of this is to cancel the thermal memory effect of the bolometer each time before it is read, thus eliminating background noise and any blurring phenomenon, as well as eliminating effect of variations of stray resistances without relationship with the scene.

In fact, by adjusting the resistance of the bolometer to the reference value in this way, the resistance of the bolometer that is read out does not depend on events that took place prior to the end of the previous cycle, during the current read cycle and, in particular, progression of the scene and thermal variation of the previous substrate.

This resistance is also substantially independent of the spatial position of the bolometer in a linear or array configuration.

The invention also substantially improves the detector in terms of its offset and gain dispersion, thereby making it possible to simplify its implementation.

In the text which follows, a bolometer that is sensitive to the incident flux from the scene and designed to produce a thermal picture element of the observed scene is referred to as an "imaging bolometer".

In particular embodiments of the invention, the means of controlling the resistance of the imaging bolometer comprises a means of injecting a predetermined reference current ($I_{ref}$) into the bolometer.

This control means advantageously comprises means of disconnecting the means of injecting the current when a voltage on a terminal of the imaging bolometer is substantially equal to a predetermined reference voltage. This reference voltage is itself advantageously adjusted to a value lower than a voltage across the terminals of the imaging bolometer during activation of the current injecting means and when the current is substantially equal to the reference current $I_{ref}$.

In one particular embodiment of the invention, the means of control is capable of fixing the resistance of the imaging bolometer to a reference resistance which depends on the temperature of the substrate above which the imaging bolometer is formed.

More especially, the means of control comprises an amplifier with feedback from a bolometer that is thermalized to the substrate; the output of the amplifier forms a determined initial reference resistance correction for a predetermined initial temperature.

Alternatively, the means of control comprises a sensor that detects the temperature of the substrate and an information processing unit (28) capable of determining, as a function of the temperature measurement, a determined initial reference resistance correction for a predetermined initial temperature.

Thus, by controlling thermalization as a function of the temperature of the focal plane, the current value of the reference resistance at which all the imaging bolometers are held remains constantly positioned as required, i.e. preferably in the vicinity of the minimum value of the natural distribution of the resistances of the imaging bolometers, regardless of the temperature of the focal plane.

Note also that the forms of circuits used to temperature control the reference resistance, regardless whether they are analogue or digital, make it possible not only to maintain adequate positioning of thermalization when the operating temperature changes, they also make it possible to ensure this adequate positioning when the actual resistances of the bolometers change over time at a constant temperature. In fact, the sensitive materials incorporated in the bolometric membranes have a tendency to drift very slowly during the service life of the detector. Over time, this drift limits the relevance of initial stimuli settings even if the detector operates at a stabilised constant temperature.

The object of the invention is also a system for detecting infrared radiation comprising an array of at least one row of devices, each comprising:
  a resistive imaging bolometer;
  and a measuring circuit capable of being electrically connected to the imaging bolometer in order to read a resistance of the bolometer.

According to the invention, these devices are each of the above-mentioned type.

According to the invention, the means of controlling the resistance of the imaging bolometer is capable of adjusting this resistance to a predetermined resistance value that is common to all the imaging bolometers in said array.

Advantageously, the means of controlling the resistance of the imaging bolometer is activated each time after the bolometer is read.

In addition, the system may comprise means of controlling a thermal dynamic range of a scene detected by the array, depending on a predetermined electrical dynamic response of the readout circuit. This means of controlling the dynamic range of the detected scene comprises means capable of activating the readout circuit once a predetermined exposure time has elapsed after deactivating the means of controlling the resistance of the imaging bolometer.

In this case, the exposure time is selected so that the dynamic range of the signals generated in relation with the detected scene is equal to or less than a corresponding dynamic response of the readout circuit.

According to one particular embodiment of the invention:
  the readout circuit is capable of reading the array one row at a time,
  the means of controlling the resistance of the bolometer is capable of controlling the array one row at a time,
  and the system also comprises means of clocking the reading and control of the resistance of the bolometer so that reading a row in the array is offset a predetermined number of rows from controlling the resistances of a row in the array.

According to another advantageous aspect of the invention, the detecting system comprises a circuit for controlling the resistance associated with each imaging bolometer in the bolometric array and capable of controlling the latter's resistance.

Alternatively, said system comprises a circuit for controlling the resistance associated with each column in the array and capable of controlling the resistance of each bolometer in that column.

The object of the present invention is also a method for reading a resistive imaging bolometer in an array of bolometers that constitutes a system for detecting infrared radiation in which the resistance of the system is adjusted to a predetermined resistance value that is common to all the bolometers in the array at least once every read cycle of the system.

BRIEF DESCRIPTION OF THE DRAWINGS

The invention is made more readily understandable by the following description which is given merely by way of example and relates to the accompanying drawings in which identical references relate to identical or analogous components and in which.

a FIG. 4 is a graph showing changes over time in the dynamic thermal range of output levels of one row in the detector shown in FIG. 1 in front of a scene having a high dynamic in temperature.

DETAILED DESCRIPTION OF THE INVENTION

Figure 1:
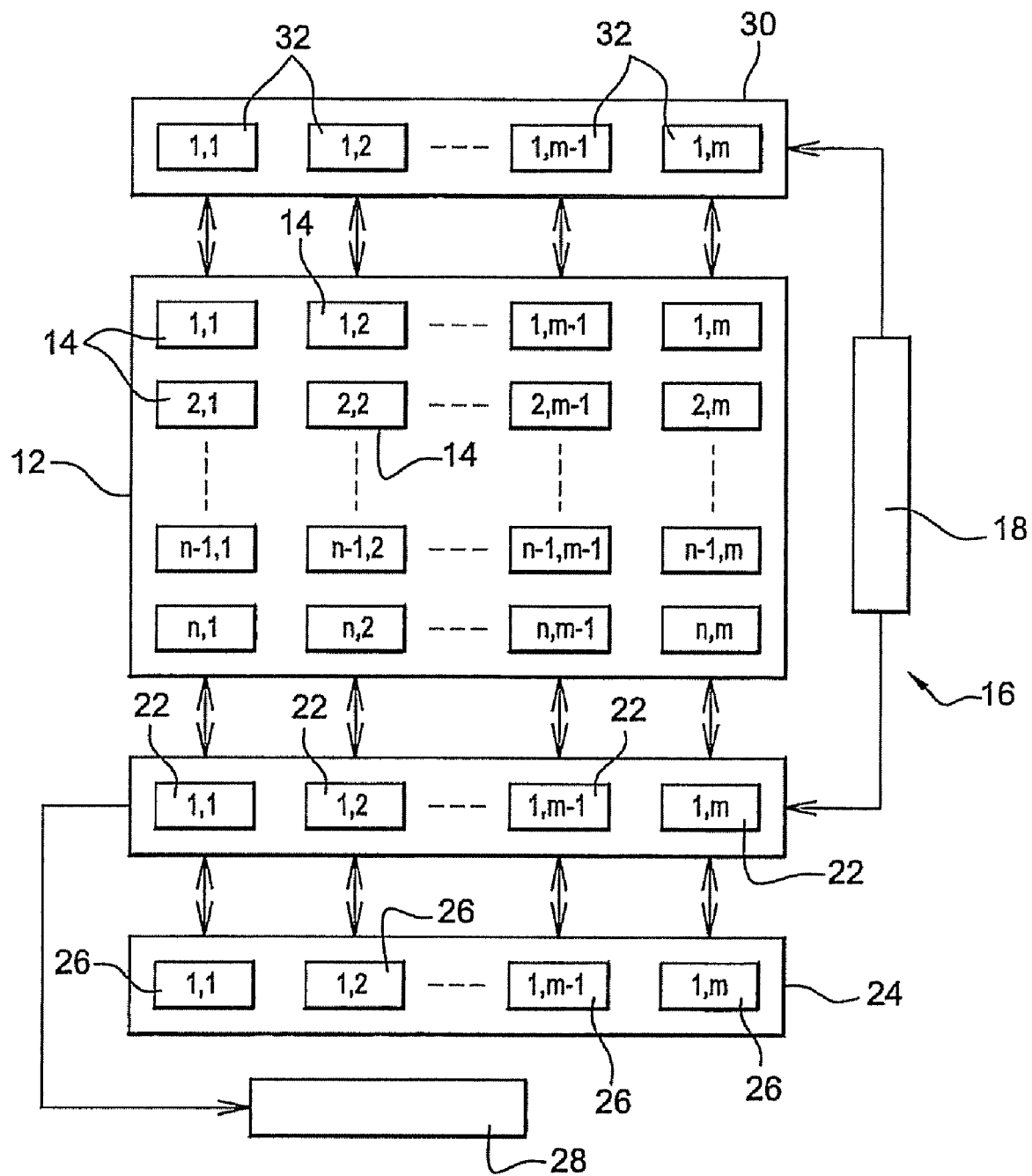
FIG. 1 is a schematic view of a bolometric detector in accordance with the invention.

FIG. 1 schematically shows a bolometric detector which comprises:

A two-dimensional imaging array 12 comprising n rows and m columns of resistive imaging bolometers 102, where n and m are integers equal to or greater than 1. The imaging array 12 is arranged in the focal plane of optics that are transparent to infrared radiation (not shown);

A readout circuit 16 implemented in a substrate underneath the surface of the imaging array 12. Readout circuit 16 comprises a row-by-row addressing circuit 18 and, for each column of imaging array 12, a measuring circuit 22 capable of being connected to every imaging bolometer in their column by electrical means;

An array of compensation bolometers 24 comprising one or more compensation circuits 26 located opposite every column of imaging array 12, but positioned off the imaging array. Array 24 comprises, for example, for every column of imaging array 12, a compensation circuit 26 capable of being connected to every imaging bolometer in the column; and An information processing unit 28 connected to readout circuit 16; the former uses an algorithm to process the signals output by the readout circuit in order to determine an infrared image of the scene projected onto array 12.

Such a bolometric detector structure is classic and is not explained in further detail below. For additional information, the reader is advised to consult, for example, the document entitled "*Uncooled amorphous silicon enhancement for 25 μm pixel pitch achievement*" by E. Mottin et al, Infrared Technology and Application XXVIII, SPIE, vol. 4820.

According to the invention, this detector structure is supplemented by thermal shutter circuit 30 of imaging bolometer array 12, under the control of addressing means 18, and formed by thermalization circuits 32, that is to say circuits controlling bolometer resistance 32, of array 12 row by row, as explained in more detail below. Shutter circuit 30 comprises, for every column of imaging array 12, a thermalization circuit 32 capable of being connected to every imaging bolometer in the column.

Figure 2:
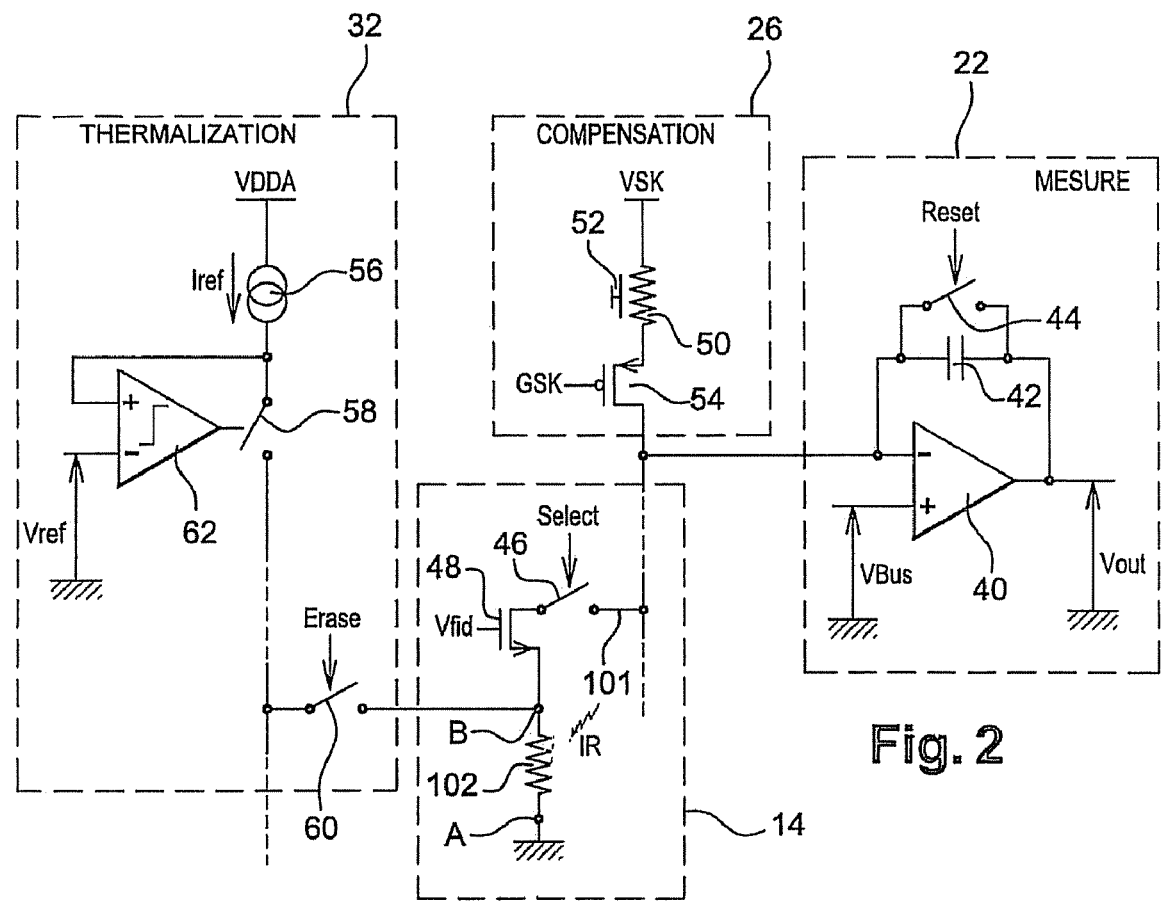
FIG. 2 is a schematic view of an imaging bolometer layout, a compensation circuit, a measuring circuit and a thermalization circuit that are all part of the detector shown in FIG. 1.

FIG. 2 shows a preferred basic layout of:
a picture element 14, comprising an imaging bolometer 102 of array 12 and components 46 and 48 that are needed in order to implement it;
a measuring circuit 22 of readout circuit 16 in order to measure imaging bolometer 102;
a compensation circuit 26 of array 24 in order to compensate a common-mode current that flows in imaging bolometer 102 when the latter is read; and
a thermalization circuit 32 for thermal shutter circuit 30 in order to thermally condition imaging bolometer 102.

Bolometer 102 is subjected to infrared radiation IR obtained from a scene and is connected to ground by a first terminal A.

Measuring circuit 22 comprises:
operational amplifier 40, the non-inverting terminal (+) of which is kept at a predetermined constant voltage Vbus;
capacitor 42, having a predetermined capacitance $C_{int}$ and connected between the inverting terminal (−) of amplifier 40 and the output of the latter;
a reset switch 44 connected in parallel with capacitor 42 and controllable by means of a "Reset" signal controlled by addressing circuit 18;
a readout switch 46, controllable by means of a "Select" signal controlled by addressing circuit 18 and connected to read column 101 which is itself connected to the inverting terminal (−) of the operational amplifier; and
a first MOS injection transistor 48 located in picture element 14; the gate of this transistor is kept at a constant predetermined voltage Vfid; its source is connected to a second terminal B of bolometer 102 and its drain is connected to the other terminal of readout switch 46.

Compensation circuit 26 used to compensate the common-mode current that flows through imaging bolometer 102 comprises a resistive compensation bolometer 50 made of the same material as imaging bolometer 102 and having a low thermal resistance relative to the substrate and, optionally, fitted with shielding 52 to protect it against radiation originating from the scene.

One of the terminals of compensation bolometer 50 is connected to a predetermined voltage VSK and its other terminal is connected to the source of a second MOS injection transistor 54 of circuit 26. The drain of transistor 54 is connected to the inverting input (−) of operational amplifier 40 and its grid is connected to a predetermined voltage GSK.

The layout and operation of the components described above is conventional and is not explained in any greater detail for the sake of brevity. For additional details, the reader is advised to consult, for example, the document entitled "*Uncooled amorphous silicon enhancement for 25 μm pixel pitch achievement*" by E. Mottin et al, Infrared Technology and Application XXVIII, SPIE, vol. 4820.

According to the invention, there is a thermalization circuit 32 which is capable of controlling resistance of imaging bolometer 102.

More especially, thermalization circuit 32 comprises a current source 56 that is connected to terminal B of imaging bolometer 102 via a first and a second controllable thermalization switch 58, 60—the latter being located remotely in picture element 14. Current source 56 injects a current of predetermined intensity $I_{ref}$ into imaging bolometer 102 when thermalization switches 58, 60 are in their closed state.

Thermalization circuit 32 also comprises a comparator 62 whose first terminal is connected, via thermalization switches 58, 60 for example, to terminal B of imaging bolometer 102 and whose second terminal is connected to a predetermined reference voltage $V_{ref}$.

Comparator 62 is also connected to first thermalization switch 58, whose state it controls depending on the result of comparing voltage $V_B$ on terminal B of imaging bolometer 102 to reference voltage $V_{ref}$.

Finally, the state of second thermalization switch 60 is controlled by means of an "Erase" signal by addressing circuit 18.

Figure 3:
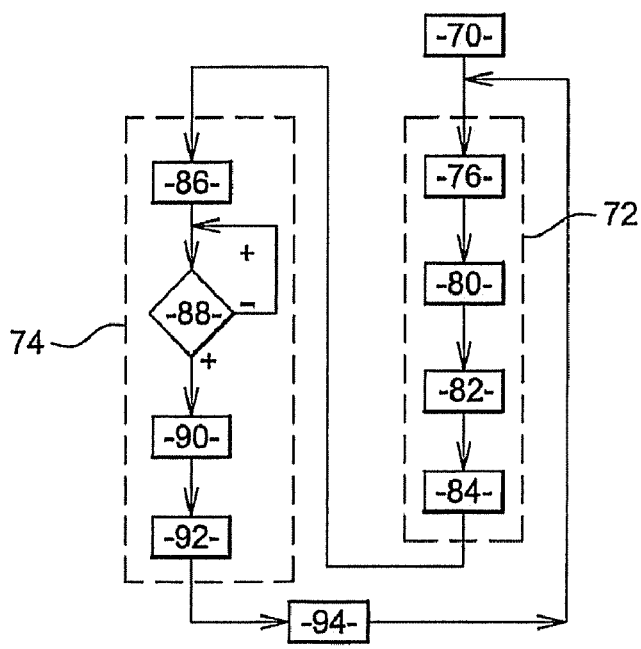
FIG. 3 is a flowchart showing operation of the detector in FIG. 1.

A method for thermalizing and reading imaging array 12 is now described in connection with FIG. 3.

In a first step 70 triggered, for example, after powering-up bolometric detector 10:
- a read pointer $N_{lect}$ of addressing circuit 18 is initialized at 1;
- one value of $V_{ref}$ and one value of $I_{ref}$ are selected in a way that will be explained in greater detail later on;
- the "Reset", "Select" and "Erase" signals associated with every imaging bolometer 102 in array 12 are adjusted to zero by addressing circuit 18, a value which corresponds to the open state of switches 44, 46, 60.

Step 70 then continues into macro step 72 to read the row $N_{lect}$ of array 12.

Read step 72 comprises a step 76 that involves the "Reset" signal of measuring circuits 22 being adjusted by addressing circuit 18 to a positive value so as to close reset switches 44. Capacitors 42 in row $N_{lect}$ are therefore discharged almost instantly.

Step 76 continues into step 80 in which the "Reset" signals are switched to zero by addressing circuit 18 so as to open reset switches 44. At the same time and still in step 80, the "Select" signals are switched to a positive value by addressing circuit 18 so as to close read switches 46 in row $N_{lect}$.

Thus, for every arrangement of row $N_{lect}$ described in FIG. 2, the difference between the current that flows through imaging bolometer 102 and the current that flows through compensation bolometer 50 is integrated by capacitor 42.

Because the current that flows through compensation bolometer 50 is substantially equal to the common-mode current that flows through imaging bolometer 102, the current difference on the input of measuring circuit 22 is substantially equivalent to the variation $\Delta R_{bolo}$ in the resistance $R_{bolo}$ of imaging bolometer 102 produced by the radiation from the scene which is incident on the imaging bolometer.

During the next step 82 the difference in the current on the input of circuit 22 is integrated over time Tint in capacitance 42.

Once the integration time has elapsed, addressing circuit 18 switches, in 84, the value of the "Select" signals of row $N_{lect}$ to zero so as to open the corresponding read switches 46. At the end of step 84, all the "Select" and "Reset" signals are at zero. The respective switches are therefore open.

Voltage $V_{out}$ on the output of an integrator 42 is then an image of the variation in the resistance $\Delta R_{bolo}$ of associated imaging bolometer 102.

Macro step 74 for thermalizing row $N_{lect}$ which follows step 84 comprises a step 86 in which the "Erase" signals of this row are switched to a positive value by addressing circuit 18 so as to close thermalization switches 60 of that row.

Note that, at this instant, the read switches 46 of row $N_{lect}$ are in their open state.

In each arrangement of row $N_{ther}$ as shown in FIG. 2, imaging bolometer 102 is thus biased by injecting current $I_{ref}$ into it and its temperature therefore rises due to the Joule effect.

In the case of semiconductor materials that are classically used to produce an imaging bolometer, such as amorphous silicon or a vanadium oxide, the thermal coefficient of the material is negative and the resistance $R_{bolo}$ of imaging bolometer 102 changes in accordance with the Arrhenius equation shown below:

$$R_{bolo} = R_{abs} \times e^{\frac{Ea}{KT}} \quad (1)$$

where:
- Ea is an thermal activation energy of the conductivity the material used in the bolometer;
- K is the Boltzmann constant;
- T is the absolute temperature of the bolometer; and
- $R_{abs}$ is the asymptotic resistance value of the bolometer when its temperature is very high.

The relative variation factor in temperature of resistance $R_{bolo}$ deduced from relation (1) is thus expressed by the following relation:

$$TCR = 1/R(dR/dT) = -Ea/(KT^2)$$

The factor TCR is thus negative and resistance $R_{bolo}$ decreases as temperature rises. During the next step 88, a test is performed in order to ascertain whether the resistance $R_{bolo}$ of imaging bolometer 102 is substantially equal to a predetermined resistance $R_{ref}$. If the result of this test is negative, thermalization of imaging bolometer 102 continues. Otherwise, test step 88 terminates by stopping thermalization of imaging bolometer 102 by disconnecting it, in step 90, from corresponding current source 56.

More especially, steps 88 and 90 are performed by comparator 62.

According to Ohm's law, the voltage $V_{bolo}$ across the terminals of imaging bolometer 102 can be expressed by using the equation:

$$V_{bolo} = V_B = R_{bolo} \times I_{ref} \quad (2)$$

Comparator 62 then switches second thermalization switch 58 to its open state, thereby disconnecting current source 56 from imaging bolometer 102 when voltage $V_{ref}$ is substantially equal to $V_B$, i.e. when $R_{bolo}$ satisfies the condition:

$$R_{bolo} = R_{ref} = \frac{V_{ref}}{I_{ref}} \quad (3)$$

This terminates thermalization of imaging bolometer 102.

Note that resistance $R_{ref}$ presented by imaging bolometer 102 at the end of thermalization does not depend on the quantity of infrared radiation received by the bolometer.

In fact, it can be demonstrated, using relation (1), that the temperature rise θ experienced by imaging bolometer 102 at the instant it is disconnected from current source 56 by comparator 62 is expressed approximately by the following equation:

$$\theta = \frac{1}{TCR} \times \ln\left(\frac{V_{ref}}{R_0 \times I_{ref}}\right) \quad (4)$$

It is apparent that this temperature rise does not depend on the received infrared radiation, it depends only on the internal parameters of imaging bolometer 102 and the parameters of thermalization circuit 32, namely current $I_{ref}$ and voltage $I_{ref}$.

The step for thermalizing row $N_{lect}$ finally terminates in step 92, during which addressing circuit 18 switches the "Erase" signals of this row to zero in order to open corresponding thermalization switches 60.

Read and thermalization step 74 then continues into step 94 which is triggered once step 74 has completed and in which the value of read pointer $N_{lect}$ is adjusted to $N_{lect}+1$ (mod n), where mod is the modulo operator. In fact, once $N_{lect}=n$, the next step will be $N_{lect}=1$.

Step 94 then loops back to the input of step 72 in order to read the next rows.

The value of current $I_{ref}$ and the value of voltage $V_{ref}$ are selected during step 70 in a way such that:
  the temperature-increase duration needed in order for the resistance $R_{bolo}$ of an imaging bolometer to reach the value $R_{ref}$ is as small as possible. This way, clocking of the "Reset" and "Select" signals in accordance with the state of the art can be preserved;
  the value of $V_{ref}$ is less than the voltage $V_B$ on terminal B of imaging bolometer 102 when thermalization of this bolometer is triggered. This way, the switching condition of associated comparator 62 is not met straight away. Otherwise, thermalization of reference bolometer 26 would be inhibited.

The values of current $I_{ref}$ and of voltage $V_{ref}$ are determined during a preliminary phase, for example at the factory, during the detector calibration phase which is classically performed before the detector is put into service. Such a preliminary phase comprises the following steps in particular:

a) the detector is switched on and subjected to predetermined reference thermal environmental conditions, namely a known stable temperature of its focal plane and uniform radiation conditions originating from the scene, typically obtained by exposure to a black body held at the maximum temperature that the detector is expected to detect when it is in use, b) the imaging bolometers 102 are subjected to a current $I_{ref}$ whose value is close to that used in order to bias the imaging bolometers during the bolometer read phase and subjected to a high comparison voltage $V_{ref}$, for instance a voltage substantially equal to voltage VDDA. At this stage, the resistances of imaging bolometers 102 are not modified by thermalization circuits 32 and the corresponding voltages $V_{out}$ on the output of measuring circuits 22 therefore correspond to the classic continuous output-level distribution of imaging bolometers 102 when illuminated by a uniform scene, i.e. the so-called "offset" dispersion;

c) voltage $V_{ref}$ is then gradually reduced. Clipping then occurs for the low distribution values of voltages $V_{out}$ when the resistances of the most resistive imaging bolometers are thermally modified by thermalization circuits 32 due to the gradual drop in voltage $V_{ref}$. The reduction of voltage $V_{ref}$ is stopped when substantially all the voltages $V_{out}$ have been modified upwards and are close to the highest voltage $V_{out}$ observed before voltage $V_{ref}$ reduces;

d) current $I_{ref}$ and voltage $V_{ref}$ thus obtained are then used to thermalize imaging bolometers 102 when the detector is in use.

The process of adjusting current $I_{ref}$ and voltage $V_{ref}$ described above can be performed manually or automatically. In the latter case, the process is performed by information processing unit 28 which outputs digital control levels $I_{ref}$ and $V_{ref}$ which are then converted into an analogue current and voltage by conventional digital/analogue conversion means. Information processing unit 28 then performs, in software for example, a processing of continuous level tables corresponding to the voltages $V_{out}$ that are formed at every stage when voltage $V_{ref}$ is decremented.

Note that, an infinite number of possible pairs ($I_{ref}$, $V_{ref}$) can be used to obtain the desired resistance $R_{ref}$. It is, however, preferable to choose a current $I_{ref}$ that is close to the biasing current that flows through imaging bolometers 102 due to the effect of biasing by associated transistors 48 during the read phase insofar as the resulting thermalization time of these transistors is compatible with the time constraints that are placed on the detector (integration time in particular). However, a higher current $I_{ref}$ may be preferred in order to reduce the thermalization time which results in resistance $R_{ref}$. Current $I_{ref}$ is preferably constant and applied directly by means of traditional analogue circuitry components because this simplifies the design of the thermalization circuits.

In the embodiment described above, the read and thermalization macros steps (72 and 74 respectively) are chained together sequentially. The array is thus addressed, read and then thermalized one row at a time.

In another embodiment, a second pointer $N_{ther}$, addressing the corresponding row, is introduced in order to thermalize a row that is different to the row that is read.

Figure 4:
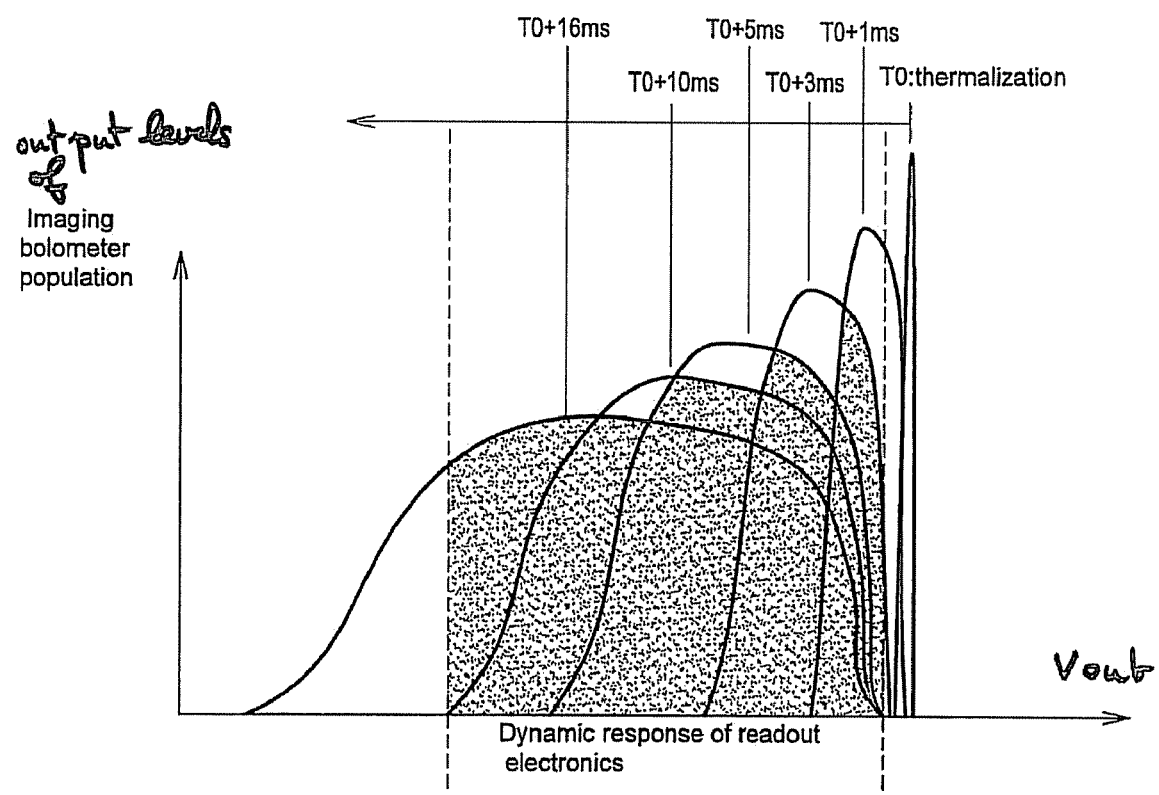

The number of rows $N_{exp}$ that separate reading from thermalization is advantageously chosen in order to control the dynamic range of the scene detected by imaging array 12 as shown in FIG. 4.

FIG. 4 shows a graph of a time series of output level distributions of the population of imaging bolometers 102 of a row N in array 102 (or the entire array 12 after the distributions of M rows have been accumulated). Each distribution corresponds to a different waiting time between thermalization and readout. FIG. 4 illustrates a case where the thermal dynamics of the observed scene slightly exceed the dynamic range of the scene of the detector in the absence of the thermalization device in accordance with the invention and which will be referred to as the "dynamic range of the reference scene".

At t=T0, row N undergoes thermalization as described previously. Temperature dispersion in the population of bolometers is then very small. This dispersion is mainly inherent in the natural variability of the detector due to fabrication tolerances and the fact that the imaging bolometers and connections between the various elements of the detector are not strictly identical.

Note that the thermalization time of a bolometer is very substantially less than its exposure time, i.e. the duration between the time that it is thermalized and the time it is read. By way of a numeric example, the exposure time is of the order of a dozen milliseconds whereas the thermalization time is of the order of a dozen microseconds.

Once thermalization has completed, the imaging bolometers in row N cool down. Every bolometer has its own rate of cooling depending on the thermal radiation that it receives (depending on the temperature of the scene pixel that concerns it). One can observe gradual spreading, as a function of time, of the distributional signal formed by row N when it is read at the end of the exposure time—this is caused by the distribution of the respective temperatures of the bolometers in this row. The temperature difference between the coldest bolometer and the hottest bolometer in row N therefore increases with time, as does the difference in the corresponding extreme output levels, as shown in FIG. 4.

Beyond an exposure time which is of the order of several times the thermal time constant of the bolometers, this distribution gradually stabilizes in a thermal equilibrium state and does not spread.

Measuring circuit 22 itself also has a fixed dynamic read response, defined as the difference between the maximum and minimum voltages that the output of operational amplifiers 40 can deliver. Such a dynamic response is shown between the two dashed lines.

It is apparent that, assuming the scene has a dynamic range that exceeds the reference dynamic range, if there is an excessively long exposure time between thermalization of row N and the time when it is read, for example 16 ms, the dynamic range of the output signals is clipped by the dynamic read response. A significant portion of the imaging bolometers that correspond to cool temperatures cannot be read in a representative way by the detector's readout circuit.

The detector according to the invention makes it possible to accommodate the dynamic range of the scene detected by the detector by adjusting the exposure time.

Advantageously, readout of row N is triggered before the electrical dynamic output range produced by the scene exceeds the dynamic response of the readout circuit by choosing an appropriate number of rows $N_{exp}$, where $N_{exp}$ is the number of rows that separate thermalization pointer $N_{ther}$ from read pointer $N_{lect}$.

In fact, an exposure time $$T_{exp} = \frac{N_{exp}}{F_{row}}$$

elapses, where $F_{row}$ is a predetermined addressing frequency of addressing circuit 18 between reading and thermalizing row N. This time can therefore be controlled by selecting $N_{exp}$.

Exposure time $T_{exp}$ is preferably chosen so that the dynamic range of the output image produced by the scene is equal to or less than the dynamic read response.

If the temperature of the focal plane drifts substantially from the temperature for which current $I_{ref}$ and voltage $V_{ref}$, and hence resistance $R_{ref}$, were determined, there is a risk, for scene temperatures at the margins of the dynamic range initially defined, of resistance $R_{ref}$ being substantially smaller than the smallest resistance of imaging bolometers 102 in the thermal equilibrium state or even experiencing difficulties in imposing resistance $R_{ref}$ on a few bolometers, or even all the bolometers, on completion of the thermalization phase.

In a first version, the detector is equipped with elements for regulating the temperature of the focal plane of the Peltier type and/or elements that heat the focal plane in order to regulate the latter's temperature around the temperature used in order to perform adjustment of current $I_{ref}$ and of voltage $V_{ref}$.

In a second version, the detector is equipped with a sensor that measures the temperature of the focal plane and prior calibration of voltages $V_{ref}$ in the case of a chosen constant current $I_{ref}$ or current/voltage pairs ($I_{ref}$, $V_{ref}$) and is interrogated depending on the temperature measurement in order to determine the current/voltage pair used.

These versions therefore assume either a temperature regulated detector and therefore require expensive, bulky, non-standard equipment or time-consuming and expensive determination of a factory calibration setting.

Figure 5:
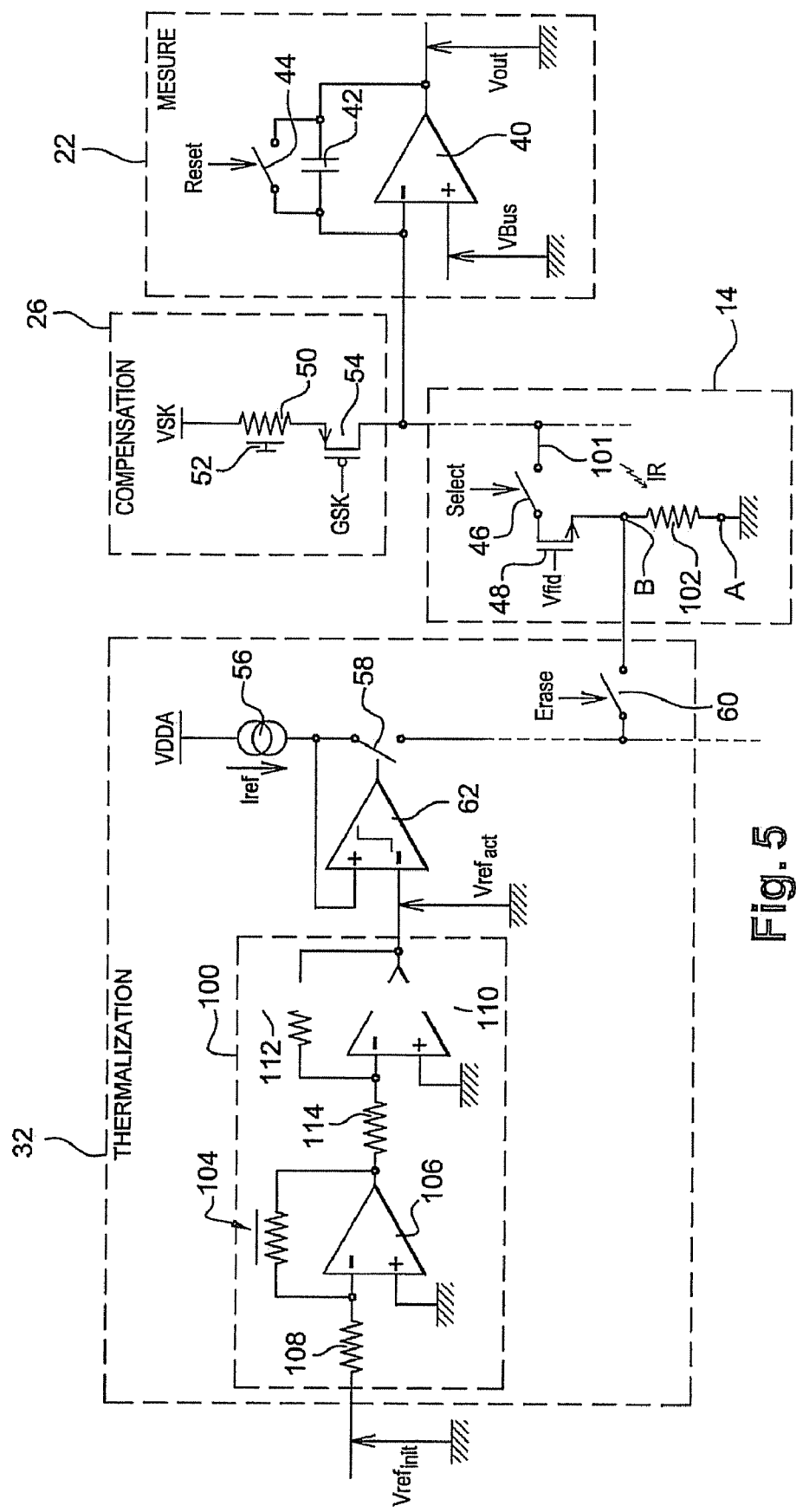
FIG. 5 is a schematic view of a bolometric detector in accordance with one particular embodiment of the invention.

FIG. 5 shows an embodiment of the invention that makes it possible to make the dynamic range of the scene insensitive to variations in the temperature of the focal plane while avoiding the use of thermal adjusting components or performing temperature calibration.

In this embodiment, a constant current $I_{ref}$ is chosen and voltage $V_{ref}$ is controlled depending on the temperature of the focal plane in which the substrate is located.

Thermalization module 32 in this embodiment reproduces circuit described in relation to FIG. 2, but it also comprises a circuit 100 to control voltage $V_{ref}$ on the inverting terminal (−) of comparator 62. For a bolometric array, only one circuit 100 is provided, for example at the end of thermalization circuit line, and its output defines the potential of a bus distributing voltage $V_{ref}$ to each column as it is shown in FIG. 5.

Control circuit 100 comprises a bolometer 104 that is identical or similar to compensation bolometers 50, has a resistance $R_{probe}$ and is feedback connected to operational amplifier 106 between the inverting terminal (−) and the output of this amplifier and a fixed resistance 108 connected between the inverting terminal (−) of amplifier 106 and an initial reference voltage $V_{ref-init}$.

Bolometer 104 is made insensitive to radiation from the scene so that the value of its resistance essentially depends on the temperature of the substrate.

Current $I_{ref}$ and voltage $V_{ref-init}$ are determined for a temperature of the focal plane that is predetermined during an adjustment step such as that described above and the value $R_{probe-init}$ of resistance 108 that is substantially equal to that of the resistance of bolometer 104 when the latter is subjected to the thermal conditions used during this adjustment step. The ratio ($R_{probe}/R_{probe-init}$) defines the correction gain applied to the initial voltage $V_{ref-init}$.

Control circuit 100 also comprises, in order to reverse the output polarity of amplifier 106, operational amplifier 110 which is feedback connected by a fixed resistance 112 between its inverting terminal (−) and its output and a fixed resistance 114 having the same value as resistance 112 and connected between the output of amplifier 106 and inverting terminal (−) of amplifier 110. The output of the latter is connected to the non-inverting terminal (+) of comparator 62, thus defining the voltage $V_{ref-act}$ used to thermalize imaging bolometer 102.

This way, comparator 62 is continuously referenced to voltage $V_{ref-act}$ in accordance with the following equation:

$$V_{ref-act} = V_{ref-init} \times \frac{R_{sonde}}{R_{sonde-init}} \quad (5)$$

Because the value $R_{probe}$ of the resistance of bolometer 104 is essentially dictated by the temperature of the substrate, the relative correction of voltage $V_{ref}$ supplied to comparator 62 therefore equals the expected relative variation of resistance $R_{ref}$ caused by variation in the temperature of the substrate relative to resistance $R_{ref-init}$ assumed in order to determine the voltage $V_{ref-init}$ at the initial temperature. Thus, applying the thermalization process imposes an updated resistance value $R_{ref-act}$, that is appropriate to the current temperature of the focal plane, for all the imaging bolometers.

In other words, voltage $V_{ref-act}$ on the output of control circuit 100, which behaves like a "temperature follower", proportionally and naturally reproduces variations in the resistance of bolometric probe 104 which responds to variations in the temperature of the substrate without it being necessary to know said temperature and continuously maintains itself close to the ideal operating point that will have initially been selected during the preliminary adjustment phase.

Alternatively, rather than controlling voltage $V_{ref-act}$ as a function of temperature, control, in accordance with the same principle, of current $I_{ref}$ is used.

In another embodiment, the voltage set point applied to comparator 62 of the thermalization circuit is determined digitally by information processing unit 28 as a function of measurement of the temperature of the substrate by a temperature sensor with current $I_{ref}$ actually remaining constant.

Information processing unit 28 thus provides an updated reference voltage set point $V_{ref-act}$ in accordance with the following equation:

$$V_{ref-act} = V_{ref-init} \exp[Ea.(1/T - 1/T_{ref})] \quad (6)$$

where $V_{ref-init}$ is the voltage initially defined as described above, T is the temperature measured by the sensor at the instant that is being considered, and $T_{ref}$ is the temperature measured by the sensor at the instant of initial adjustment that corresponds to voltage $V_{ref-init}$.

Imaging bolometers 102 are thus thermalized at resistance $$R_{ref-act} = \frac{V_{ref-act}}{I_{ref}}$$

and are therefore thermalized as a function of the current temperature of the substrate.

Arrhenius relation (6) is given by way of example. Generally speaking, the invention aims at computing a voltage $V_{ref-act}$ which is the most suited for maintaining the optimal operating conditions according to substrate temperature. For example, an other relation may be used, for example defined by adjusting $V_{ref-act}$ according to an empirical calibration of imaging bolometer behaviour based on substrate temperature, for scene conditions corresponding to initial settings.

Alternatively, current $I_{ref}$ is controlled as a function of the temperature of the substrate in accordance with an estimate of the same type as equation (6) while voltage $V_{ref}$ is kept constant.

By controlling thermalization as a function of the temperature of the focal plane, the current value of the reference resistance at which all the imaging bolometers are held remains constantly positioned as required, i.e. in the vicinity of the minimum value of the natural distribution of the resistances of the imaging bolometers when the detector is observing a uniform scene at the maximum temperature of its dynamic range, regardless of the temperature of the focal plane.

In other words, the detector in accordance with these versions, has scene dynamics which are primarily independent of the natural dispersion of the resistances of the imaging bolometers, regardless of the temperature of the focal plane. The scene dynamics of detectors according to the prior art are primarily limited, in terms of high focal plane temperatures, by this natural dispersion of resistances. The use of this detector in accordance with the versions of the invention results in a substantial gain in dynamic response in addition to the advantages that have already been explained.

Note that the forms of circuits used to temperature control the reference resistance, regardless whether they are analogue or digital, make it possible not only to maintain adequate positioning of thermalization when the operating temperature changes, they also make it possible to ensure this adequate positioning when the actual resistances of the bolometers change over time at a constant temperature. In fact, the sensitive materials incorporated in the bolometric membranes have a tendency to drift very slowly, but substantially uniformly, during the service life of the detector. Over time, this drift limits the relevance of initial stimuli settings even if the detector operates at a stabilized constant temperature.

This invention has the following advantages:
substantial elimination of the thermal memory effect of imaging array 12 and hence elimination of blurring effects. In fact, before any read operation, the resistances $R_{bolo}$ of the imaging bolometers are adjusted to a reference value $R_{ref}$ that is not dependent on the scene. This way, only variations in resistance that occurred during exposure of the bolometers in the time between their thermalization and reading are detected.
simple and effective control of the dynamic range of the scene which can be accessed by imaging array 12 by using a thermalization pointer in the clock logic circuit;
substantial elimination of offset and gain spatial dispersion effects by forming an electrical resistance that is substantially identical across all the imaging bolometers before the signal is integrated; potential elimination of the conventional mechanical optical shutter—this significantly improves economic attractiveness, the continuity of service of the detector during an observation phase and the service life of the system.
a substantial increase in the scene dynamics regardless of the temperature of the focal plane if the latter is capable of variation.

One particular embodiment of the invention has been described.

In an alternative embodiment, current sources 56 are controllable. For example, a current profile that is variable during the thermalization time can be determined in advance in order to optimize this duration still further.

Similarly, row-by-row thermalization of imaging array 12 has been described. Alternatively, a thermalization circuit 32 can be provided for each imaging bolometer 102 in imaging array 12. This is particularly advantageous if a measuring circuit 22 is also provided for every imaging bolometer. This achieves synchronous thermalization of all the imaging bolometers and this substantially reduces the artefacts produced by row-by-row thermalization of the imaging array.

Similarly, thermalization of an imaging array associated with a compensation structure has been described. It is apparent that the present invention also applies to an imaging array associated with a so-called "reference" structure such as that described in the document entitled "*Performance of 320×240 Uncooled Bolometer-type Infrared Focal Plane Arrays*" by Yutaka Tanake et al., Proc. SPIE, vol 5074.

What is more, the invention can be applied to read modes that use other common-mode current rejection techniques, for instance by biasing a Wheatstone bridge type bolometric bridge.

This invention has applications in the field of image sensors that utilize bolometric detection, regardless of the detection frequency band or the type of bolometric material used to fabricate the imaging bolometers and reference bolometers, e.g. amorphous silicon (a-Si), vanadium oxide (Vox) (a metal).

Due to its ability to adapt to the various operating temperatures of an image sensor that uses bolometric detection, the invention is applicable to both thermally regulated sensors and to sensors that operate with a variable focal-plane temperature (commonly designated by the term "TEC-less"), regardless whether or not a shutter is provided in association with the optics.

The invention claimed is:

1. A device for detecting infrared radiation comprising a resistive imaging bolometer, said device being electrically connected to a circuit for measuring a resistance of the imaging bolometer, wherein it said device comprises means for controlling and adjusting the resistance of the imaging bolometer to a predetermined reference value by injecting current into the imaging bolometer.

2. The device for detecting infrared radiation as claimed in claim 1, wherein the means for controlling the resistance of the imaging bolometer comprises means for injecting a predetermined reference current into the imaging bolometer.

3. The device for detecting infrared radiation as claimed in claim 2, wherein the means for controlling the resistance of the imaging bolometer comprises means for disconnecting the current injection means when a voltage on a terminal of the imaging bolometer is substantially equal to a predetermined reference voltage.

4. The device for detecting infrared radiation as claimed in claim 3, wherein the reference voltage is adjusted to a value less than a voltage across the terminals of the imaging bolometer during activation of the current injection means and when the current is substantially equal to the reference current.

5. The device as claimed in claim 1, wherein the means for controlling the resistance of the imaging bolometer is capable of fixing the resistance of the imaging bolometer to a reference resistance which depends on the temperature of the substrate above which the imaging bolometer is formed.

6. The device as claimed in claim 5, wherein the means for controlling the resistance of the imaging bolometer comprises an amplifier with feedback from a bolometer that is thermalized to the substrate, the output of the amplifier forming a determined initial reference resistance correction for a predetermined initial temperature.

7. The device as claimed in claim 5, wherein the means for controlling the resistance of the imaging bolometer comprises a sensor that detects the temperature of the substrate and an information processing unit capable of determining, as a function of the temperature measurement, a determined initial reference resistance correction for a predetermined initial temperature.

8. A system for detecting infrared radiation comprising an array of at least one row of devices, each device comprising:
a resistive imaging bolometer; and
a measuring circuit capable of being electrically connected to the imaging bolometer in order to read a resistance of the imaging bolometer,
wherein each device comprises means for controlling and adjusting the resistance of the imaging bolometer to a predetermined reference value by injecting current into the imaging bolometer.

9. The system for detecting infrared radiation according to claim 8, wherein the means for controlling the resistance of the imaging bolometer comprises means for injecting a predetermined reference current into the imaging bolometer.

10. The system for detecting infrared radiation according to claim 9, wherein the means for controlling the resistance of the imaging bolometer comprises means for disconnecting current injection means when a voltage on a terminal of the imaging bolometer is substantially equal to a predetermined reference voltage.

11. The system for detecting infrared radiation according to claim 10, wherein the reference voltage is adjusted to a value less than a voltage across the terminals of the imaging bolometer during activation of current injection means and when the current is substantially equal to the reference current.

12. The system for detecting infrared radiation according to claim 8, wherein the means for controlling the resistance of the imaging bolometer is capable of fixing the resistance of the imaging bolometer to a reference resistance which depends on the temperature of the substrate above which the imaging bolometer is formed.

13. The system for detecting infrared radiation according to claim 12, wherein the means for controlling the resistance of the imaging bolometer comprises an amplifier with feedback from a bolometer that is thermalized to the substrate, the output of the amplifier forming a determined initial reference resistance correction for a predetermined initial temperature.

14. The system for detecting infrared radiation according to claim 12, wherein the means for controlling the resistance of the imaging bolometer comprises a sensor that detects the temperature of the substrate and an information processing unit capable of determining, as a function of the temperature measurement, a determined initial reference resistance correction for a predetermined initial temperature.

15. The system for detecting infrared radiation as claimed in claim 8, wherein the means for controlling the resistance of the imaging bolometer is capable of adjusting the resistance of the imaging bolometer to a predetermined resistance value that is common to all the imaging bolometers in the array.

16. The system for detecting infrared radiation as claimed in claim 8, wherein the means for controlling the resistance of the imaging bolometer is activated each time after the imaging bolometer is read.

17. The system for detecting infrared radiation as claimed in claim 8, further comprising a readout circuit implemented in a substrate underneath the surface of the imaging array, and means for controlling a thermal dynamic range of the scene that can be accessed by the system as a function of a predetermined dynamic response of the readout circuit.

18. The system for detecting infrared radiation as claimed in claim 17, wherein the means for controlling the dynamic range of the scene comprises means capable of activating reading of the imaging bolometer, once a predetermined exposure time has elapsed after deactivating means for controlling the resistance of the imaging bolometer.

19. The system for detecting infrared radiation as claimed in claim 18, wherein the exposure time is selected so that the dynamic range of the signals generated in relation with the detected scene is equal to or less than a corresponding dynamic response of the readout circuit.

20. The system for detecting infrared radiation as claimed in claim 17:
wherein the readout circuit is capable of reading the array one row at a time,
wherein the means for controlling the resistance of the bolometer is capable of controlling the array one row at a time, and
wherein the system also comprises means of clocking reading and control of the resistance of the bolometer so that reading a row in the array is offset a predetermined number of rows from controlling the resistances of a row in the array.

21. The system for detecting infrared radiation as claimed in claim 8, further comprising a circuit for controlling resistance associated with every imaging bolometer in the bolometric array and capable of controlling the resistance of the imaging bolometer.

22. The system for detecting infrared radiation as claimed in claim 8, further comprising a circuit for controlling resistance associated with every column in the array and capable of controlling the resistance of every imaging bolometer in that column.

23. A method for reading a resistive imaging bolometer in an array of bolometers that constitutes a system for detecting infrared radiation in which the resistance of the imaging bolometer is adjusted to a predetermined resistance value that is common to all the imaging bolometers in the array at least once every read cycle of the imaging bolometer by injecting current into the imaging bolometer.

* * * * *